US008862070B2

(12) United States Patent
Kim et al.

(10) Patent No.: US 8,862,070 B2
(45) Date of Patent: Oct. 14, 2014

(54) APPARATUS AND METHOD FOR SELECTING PRECODING MATRIX IN MULTIPLE ANTENNA WIRELESS COMMUNICATION SYSTEM

(75) Inventors: Yu-Seok Kim, Seoul (KR); Eun-Yong Kim, Hwaseong-si (KR); Yung-Soo Kim, Seongnam-si (KR); Sang-Min Lee, Seoul (KR); Eun-Seok Ko, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 12/583,417

(22) Filed: Aug. 20, 2009

(65) Prior Publication Data
US 2010/0048233 A1 Feb. 25, 2010

(30) Foreign Application Priority Data
Aug. 22, 2008 (KR) .................. 10-2008-0082353

(51) Int. Cl.
*H04B 7/00* (2006.01)
*H04W 4/20* (2009.01)

(52) U.S. Cl.
CPC .................. *H04W 4/20* (2013.01)
USPC ............ 455/69; 455/501; 455/524; 455/101; 455/562.1; 455/140; 455/452.2; 455/127.1; 455/63.1; 455/422.1; 370/318; 370/328; 370/329; 370/252; 370/203; 375/267; 375/259; 375/260; 375/299

(58) Field of Classification Search
USPC ......... 455/562.1, 513, 102, 69, 524; 370/342, 370/329, 203, 347, 335, 441, 208, 252
See application file for complete search history.

(56) References Cited

U.S. PATENT DOCUMENTS

| 5,867,478 | A * | 2/1999 | Baum et al. .................... 370/203 |
| 7,983,236 | B2 * | 7/2011 | Rinne et al. .................... 370/342 |
| 2005/0233710 | A1 * | 10/2005 | Lakkis et al. ................. 455/102 |
| 2007/0066332 | A1 * | 3/2007 | Zhang et al. .................. 455/513 |
| 2007/0281746 | A1 * | 12/2007 | Takano et al. .............. 455/562.1 |
| 2008/0212702 | A1 * | 9/2008 | Pan et al. ...................... 375/260 |
| 2009/0016278 | A1 * | 1/2009 | Wakabayashi ................ 370/329 |
| 2009/0046569 | A1 * | 2/2009 | Chen et al. .................... 370/203 |
| 2011/0034192 | A1 * | 2/2011 | Lim et al. ...................... 455/501 |

* cited by examiner

*Primary Examiner* — Ganiyu A Hanidu

(57) ABSTRACT

A Mobile Station (MS) is operable to select a precoding matrix in a multi-antenna wireless communication system. The method includes receiving, from a serving Base Station (BS), information on a precoding matrix of which use is prohibited and a precoding matrix to be used by a neighbor BS, estimating an interference signal for the precoding matrix to be used by the neighbor BS, and selecting a precoding matrix to be used by the serving BS by considering the estimated interference signal from the remaining precoding matrixes except for the precoding matrix of which use is prohibited among precoding matrixes used by the serving BS.

18 Claims, 11 Drawing Sheets

APPARATUS AND METHOD FOR SELECTING PRECODING MATRIX IN MULTIPLE ANTENNA WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Aug. 22, 2008 and assigned Serial No. 10-2008-0082353, the entire disclosure of which is hereby incorporated by reference.

TECHNICAL FIELD OF THE INVENTION

The present invention relates to an apparatus and method for selecting a precoding matrix in a multiple antenna wireless communication system. More particularly, the present invention relates to an apparatus and method for restricting a precoding matrix which is improved to reduce inter-cell interference.

BACKGROUND OF THE INVENTION

Research on reducing inter-cell interference is actively conducted in a wireless communication system to provide users with a better Quality of Service (QoS). Accordingly, a scheme for reducing inter-cell interference through cooperation between Base Stations (BS) is being researched. The scheme for reducing inter-cell interference through cooperation between the BSs may result in performance deterioration when a time delay occurs according to an amount of information exchanged between the BSs. Therefore, it is important to exchange a small amount of information when the BSs cooperate with each other.

Precoding Matrix Index (PMI) restriction, or PMI recommendation, is one exemplary scheme for cooperation between BSs. The PMI restriction is a scheme in which a Mobile Station (MS) estimates a precoding matrix (or vector) of a neighbor BS expected to have a great interference to the MS itself in a wireless communication system, so that the estimated precoding matrix is restricted not to be used when the neighbor BS performs beamforming on downlink information.

FIG. 1 illustrates a structure of a system using a conventional PMI restriction scheme.

Referring to FIG. 1, for the PMI restriction scheme, an $MS_A$ 110 estimates a downlink channel $H_{AA}$ 120 with respect to a serving $BS_A$ 100 and selects a precoding matrix $v^1_A$ 1A having a greatest gain for the $MS_A$ 110 from precoding matrixes $v^i_A$ used by the serving $BS_A$ 100. Further, the $MS_A$ 110 estimates a downlink channel $H_{AB}$ 122 with respect to a neighbor $BS_B$ 102 and selects a precoding matrix $v^2_B$ that is expected to have a greatest interference to the $MS_A$ 110 from precoding matrixes $v^i_B$ used by the neighbor $BS_B$ 102. Thereafter, the $MS_A$ 110 reports information regarding the selected precoding matrixes to the serving $BS_A$ 100. In this case, as shown in FIG. 2A, the $MS_A$ 110 selects a precoding matrix $v^1_A$ of an effective channel $H_{AA}v^1_A$ 201 having a greatest channel gain from effective channels $H_{AA}v^i_A$ as an allowed precoding matrix, and selects a precoding matrix $v^2_B$ of an effective channel $H_{AB}v^2_B$ 203, which has a greatest influence on the $H_{AA}v^1_A$ 201 having the greatest channel gain, from expected interference effective channels $H_{AB}v^i_B$ as a restricted precoding matrix.

Upon receiving information on the allowed precoding matrix $v^1_A$ and the restricted precoding matrix $v^2_B$ 130 from the $MS_A$ 110, the $BS_A$ 100 transmits the information regarding the restricted precoding matrix $v^2_B$ 130 to the neighbor $BS_B$ 102. Additionally, the neighbor $BS_B$ 102 transmits the received information regarding the restricted precoding matrix $v^2_B$ 130 to an $MS_B$ 112 included in the coverage of the neighbor $BS_B$ 102. In this case, the allowed precoding matrix $v^1_A$ is used when the $BS_A$ 100 transmits downlink data to the $MS_A$ 110.

The $MS_B$ 112 estimates a downlink channel $H_{BB}$ 126 with respect to its serving $BS_B$ 102, and selects a precoding matrix having a greatest gain for the $MS_B$ 112 from the precoding matrixes $v^i_B$ used by the serving $BS_B$ 102 except for the restrictive precoding matrix $v^2_B$. Thereafter, the $MS_B$ 112 transmits the selected precoding matrix to the serving $BS_B$ 102. In this case, as shown in FIG. 2B, the $MS_B$ 112 selects a precoding matrix $v^3_B$ of an effective channel $H_{BB}v^3_B$ 223 having a greatest gain from the effective channels $H_{BB}v^i_B$ except for an effective channel $H_{BB}v^2_B$ 221 corresponding to the restrictive precoding matrix.

If the $MS_B$ 112 selects the precoding matrix having the greatest gain from the remaining precoding matrixes except for the restrictive precoding matrix as described above, interference to the $MS_A$ 110 can be reduced. However, in this case, a problem exists wherein the $MS_B$ 112 experiences interference by data transmitted to the $MS_A$ 110. For example, as shown in FIG. 2B, in a state where only the effective channel $H_{BB}v^2_B$ 221 corresponding to the restrictive precoding matrix is excluded, the effective channel $H_{BB}v^3_B$ 223 having a greatest gain for the $MS_B$ 112 experiences a great interference by the interference effective channel $H_{BA}v^1_A$ 225 established by the precoding matrix $v^1_A$ selected by the $MS_A$ 110.

SUMMARY OF THE INVENTION

To address the above-discussed deficiencies of the prior art, it is a primary aspect of the present invention is to solve at least the above-mentioned problems and/or disadvantages and to provide at least the advantages described below. Accordingly, an aspect of the present invention is to provide an apparatus and method and for selecting a precoding matrix in a multiple antenna wireless communication system.

Another aspect of the present invention is to provide an apparatus and method for restricting a precoding matrix that is improved to reduce inter-cell interference in a multiple antenna wireless communication system.

Another aspect of the present invention is to provide an apparatus and method in which a MS selects a precoding matrix by considering precoding matrixes used by a neighbor BS in a multiple antenna wireless communication system.

According to one aspect of the present invention, a method of an MS for selecting a precoding matrix in a multiple antenna wireless communication system is provided. The method includes receiving, from a serving BS, information regarding a precoding matrix of which use is prohibited and a precoding matrix to be used by a neighbor BS, estimating an interference signal for the precoding matrix to be used by the neighbor BS, and selecting a precoding matrix to be used by the serving BS by considering the estimated interference signal from the remaining precoding matrixes except for the precoding matrix of which use is prohibited among precoding matrixes used by the serving BS.

According to another aspect of the present invention, a method of a BS for providing precoding matrix information in a multiple antenna wireless communication system is provided. The method includes receiving, from an MS, information regarding a precoding matrix to be used by the BS and a precoding matrix of which use is prohibited to a neighbor BS, and transmitting, to the neighbor BS, the information on the precoding matrix to be used by the BS and the precoding matrix of which use is prohibited to the neighbor BS.

According to another aspect of the present invention, a method of a BS for selecting a precoding matrix in a multiple antenna wireless communication system is provided. The method includes receiving, from a neighbor BS, information regarding a precoding matrix of which use is prohibited and a precoding matrix used by the neighbor BS, and transmitting, to an MS included in the coverage of the BS, information on the precoding matrix of which use is prohibited and the precoding matrix to be used by the neighbor BS.

According to another aspect of the present invention, an MS apparatus for selecting a precoding matrix in a multiple antenna wireless communication system is provided. The apparatus includes a transceiver for receiving, from a serving BS, information on a precoding matrix of which use is prohibited and a precoding matrix to be used by a neighbor BS, and a precoding matrix selector for estimating an interference signal for the precoding matrix to be used by the neighbor BS, and for selecting a precoding matrix to be used by the serving BS by considering the estimated interference signal from the remaining precoding matrixes except for the precoding matrix of which use is prohibited among precoding matrixes used by the serving BS.

In accordance with another aspect of the present invention, a BS apparatus for providing precoding matrix information in a multiple antenna wireless communication system is provided. The apparatus includes a transceiver for receiving, from an MS, information on a precoding matrix to be used by the BS and a precoding matrix of which use is prohibited to a neighbor BS, and for transmitting, to the neighbor BS, the information on the precoding matrix to be used by the BS and the precoding matrix of which use is prohibited to the neighbor BS.

According to another aspect of the present invention, a BS apparatus for selecting a precoding matrix in a multiple antenna wireless communication system is provided. The apparatus includes a transceiver for receiving, from a neighbor BS, information regarding a precoding matrix of which use is prohibited and a precoding matrix used by the neighbor BS, and for transmitting, to an MS included in the coverage of the BS, information on the precoding matrix of which use is prohibited and the precoding matrix to be used by the neighbor BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention described below relates to an apparatus and method for restricting a precoding matrix which is improved to reduce inter-cell interference in a multiple antenna wireless communication system. For convenience of explanation, a precoding vector will be described for example, and the same can also be applied to a precoding matrix.

First, the present invention assumes that each Base Station (BS) and a Mobile Station (MS) share a codebook that is a set of precoding matrixes (or vectors). For example, it is assumed that each BS and the MS share a codebook consisting of M precoding vectors as expressed by Equation 1:

$$v \in \{v^1, v^2, v^3, \ldots, v^M\}$$ [Eqn. 1]

Although two neighbor BSs are assumed in the following description, the present invention can also apply when three or more neighbor BSs are present. A case where the three or more neighbor BSs are present will be described below with reference to FIG. 11 and FIG. 12. If it is assumed that a $BS_A$ and a $BS_B$ are two neighbor BSs, an $MS_A$ is an MS which receives a service from the $BS_A$, and an $MS_B$ is an MS which receives a service from the $BS_B$, then the $MS_A$ and the $MS_B$ receive a signal expressed by Equations 2A and 2B:

$$Y_A = H_{AA} v_A s_A + H_{AB} v_B s_B + n_A \quad \text{[Eqn. 2A]}$$

$$Y_B = H_{BA} v_A s_A + H_{BB} v_B s_B + n_B \quad \text{[Eqn. 2B]}$$

In Equations 2A-2B, $Y_A$ denotes a signal received by the $MS_A$, $Y_B$ denotes a signal received by the $MS_B$, $H_{ij}$ denotes a downlink channel between an $MS_i$ and a $BS_j$, $v_i$ denotes a precoding vector used by a $BS_i$, $s_i$ denotes data transmitted by the $BS_i$, and $n_i$ denotes noise for the $MS_i$.

Now, an improved Precoding Matrix Index (PMI) scheme proposed in the present invention will be described under the aforementioned assumption.

Figure 1:
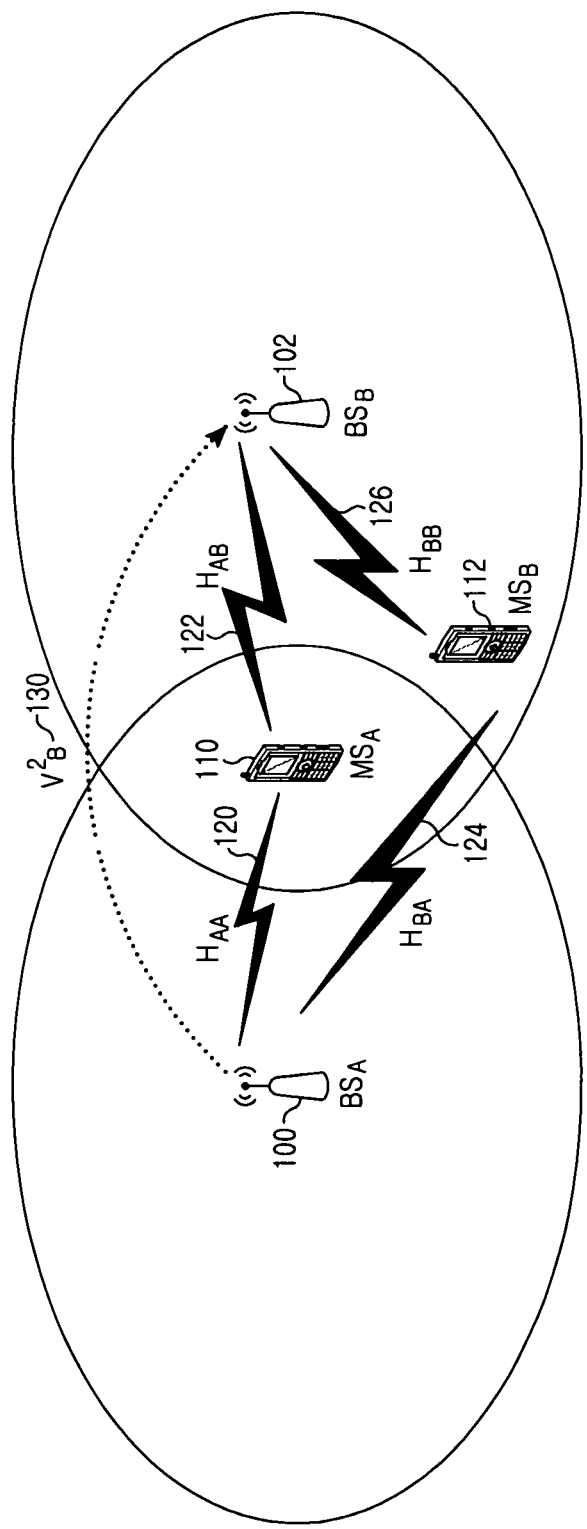
FIG. 1 illustrates a structure of a system using a conventional Precoding Matrix Index (PMI) restriction scheme.
Figure 2A:
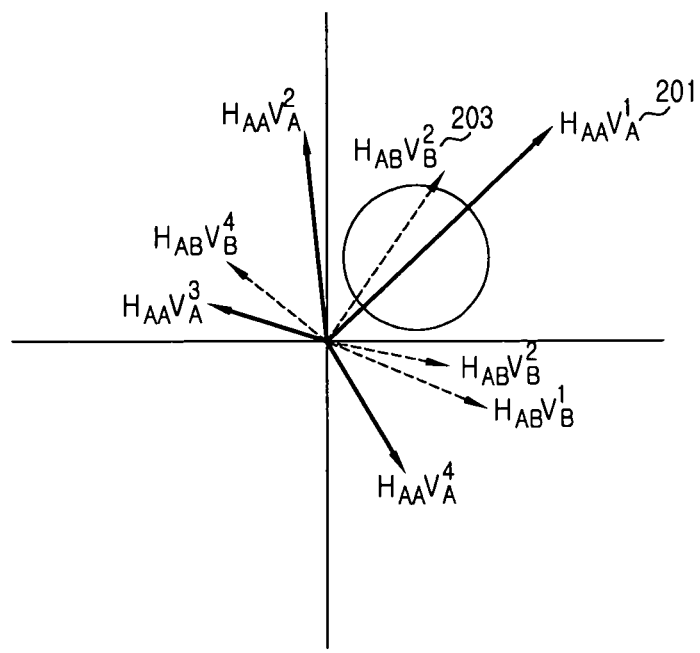
FIGS. 2A and 2B illustrate an example of selecting a precoding matrix in a system using a conventional PMI restriction scheme.
Figure 2B:
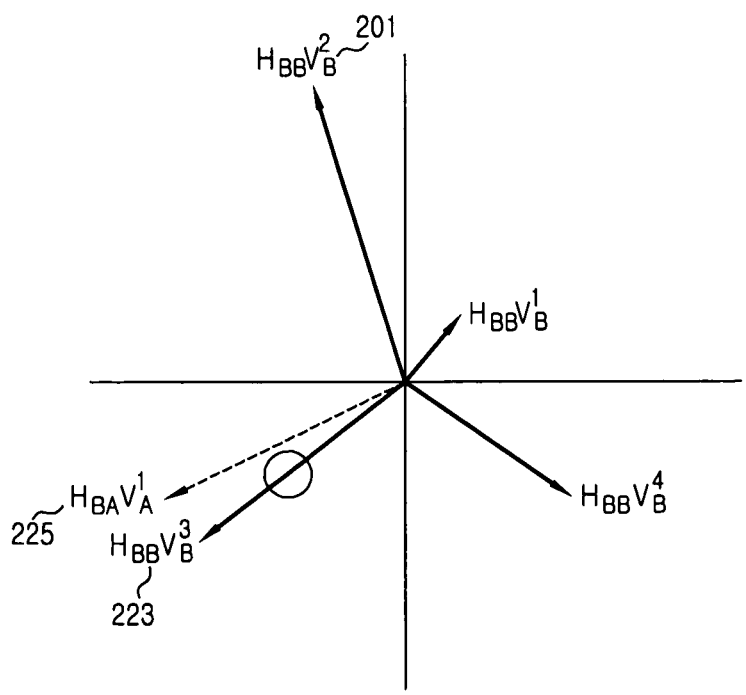
Figure 3:
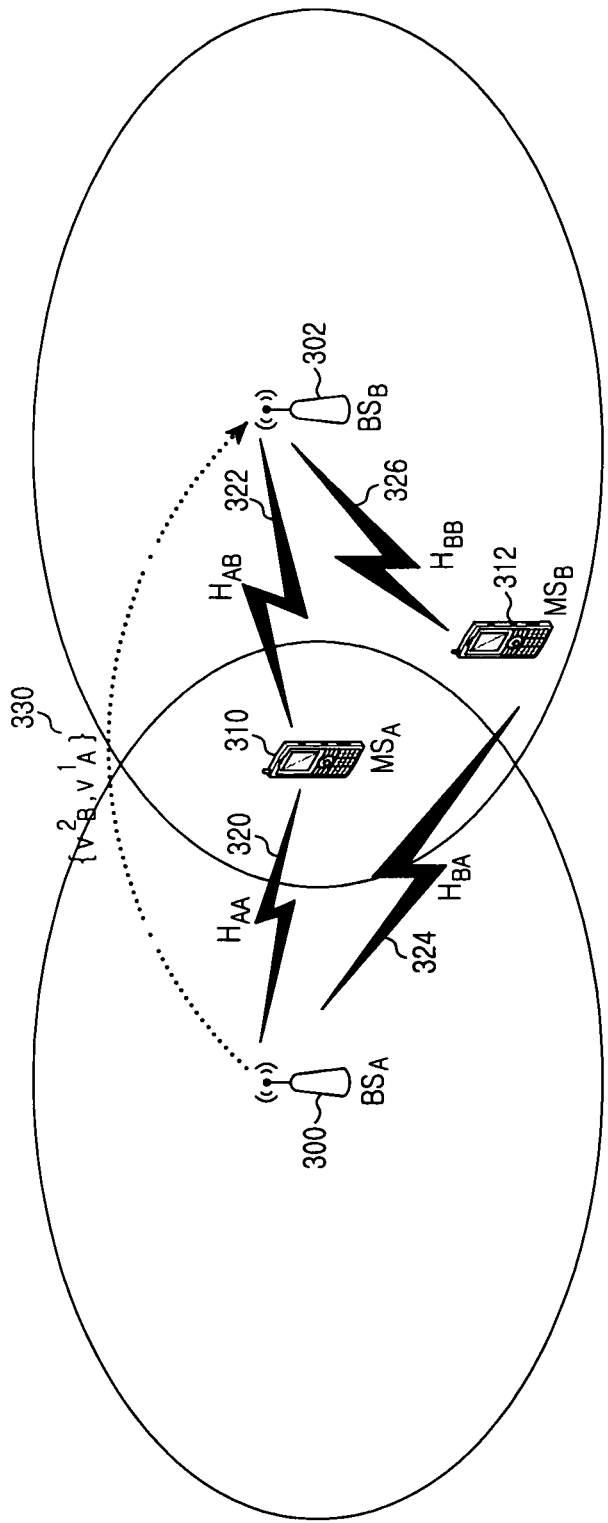
FIG. 3 illustrates a structure of a multiple antenna wireless communication system according to an exemplary embodiment of the present invention.

FIG. 3 illustrates a structure of a multi-antenna wireless communication system according to an exemplary embodiment of the present invention.

Referring to FIG. 3, an $MS_A$ 310 estimates a downlink channel $H_{AA}$ 320 with respect to a serving $BS_A$ 300 and selects a precoding vector $v^1_A$ having a greatest gain for the $MS_A$ 310 from precoding vectors $v^i_A$ used by the serving $BS_A$ 300. Further, the $MS_A$ 310 estimates a downlink channel $H_{AB}$ 322 with respect to a neighbor $BS_B$ 302 and selects a precoding vector $v^2_B$ that is expected to have a greatest interference to the $MS_A$ 310 from precoding vectors $v^i_B$ used by the neighbor $BS_B$ 302. Thereafter, the $MS_A$ 310 reports information on the selected precoding vectors to the serving $BS_A$ 300. In this case, each of the $BS_A$ 300 and $BS_B$ 302 uses an orthogonal pilot, a pseudo-random scramble pilot, and the like, so that each MS can estimate a downlink channel by identifying each BS.

Upon receiving information on an allowed precoding vector $v^1_A$ and a restricted precoding vector $v^2_B$ from the $MS_A$ 310, as indicated by 330 in FIG. 3, the $BS_A$ 300 transmits the received information on the precoding vectors $v^1_A$ and $v^2_B$ to the neighbor $BS_B$ 302 through a backhaul, and the neighbor $BS_B$ 302 transmits the received information on the precoding vectors $v^1_A$ and $v^2_B$ to an $MS_B$ 312 included in the coverage of the neighbor $BS_B$ 302. The backhaul denotes an X2 interface in case of using a Long Term Evolution (LTE) system for example. The X2 interface may be configured in a wireless or wired fashion. In addition, the $MS_A$ 310 may directly transmit the precoding vector information to the neighbor $BS_B$ 302. In this case, there is an advantage in that a time delay can be reduced. Disadvantageously, however, overall cell performance may deteriorate when resources are occupied by a neighbor cell.

Figure 4:
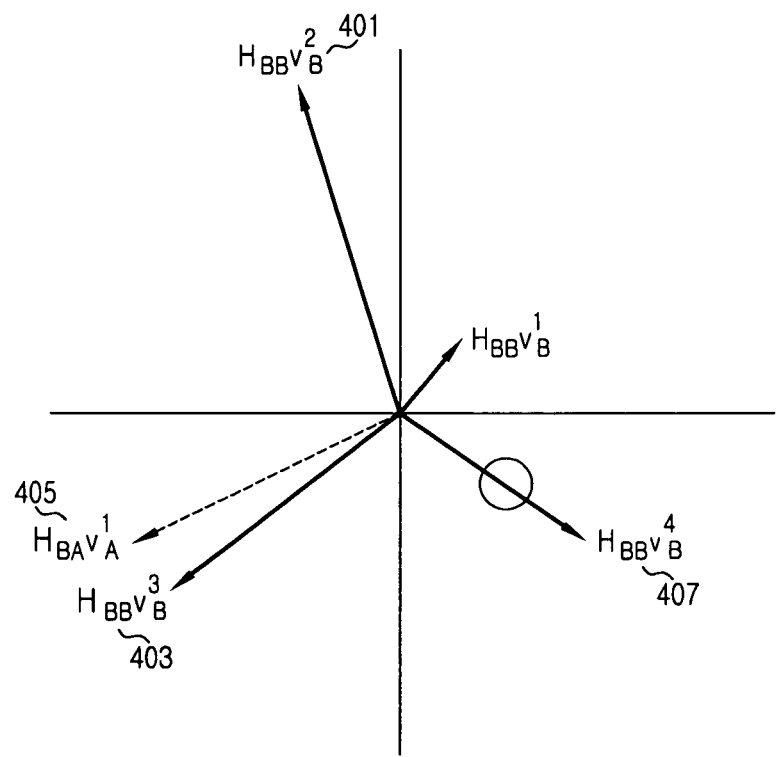
FIG. 4 illustrates an example of selecting a precoding matrix in a multiple antenna wireless communication system according to an exemplary embodiment of the present invention.

Then, the $MS_B$ 312 estimates a downlink channel $H_{BA}$ 324 with respect to its neighbor $BS_A$ 300 and a downlink channel $H_{BB}$ 326 with respect to its serving $BS_B$ 302, and selects an allowed precoding vector when data is received from the serving $BS_B$ 302 by using information regarding the precoding vectors $v^1_A$ and $v^2_B$ and received from the serving $BS_B$ 302. That is, the $MS_B$ 312 evaluates a precoding vector $v^2_B$, of which use is prohibited, and a precoding vector $v^1_A$ used by the neighbor $BS_A$ 300 by using the received information on the precoding vectors $v^1_A$ and $v^2_B$, and predicts an interference signal $H_{BA} v^1_A$ from the neighbor $BS_A$ 300. Thereafter, the $MS_B$ 312 selects a precoding vector robust to the predicted interference signal $H_{BA} v^1_A$ from the remaining precoding vectors except for the prohibited precoding vector $v^2_B$ among the precoding vectors $v^i_B$ used by the serving $BS_B$ 302, i.e., selects a precoding vector having a maximum post-processing Signal to Interference plus Noise Ratio (SINR) as expressed by Equation 3 below. For example, as shown in FIG. 4, a precoding vector $v^4_B$ of an effective channel $H_{BB} v^4_B$ 407 robust to an interference signal $H_{BA} v^1_A$ 405 of the neighbor $BS_A$ 300 is selected from the remaining effective channels $H_{BB} v^1_B$, $H_{BB} v^3_B$, and $H_{BB} v^4_B$ except for an effective channel $H_{BB} v^2_B$ 401 for the prohibited precoding vector $v^2_B$ among effective channels $H_{BB} v^1_B$, $H_{BB} v^2_B$, $H_{BB} v^3_B$, and $H_{BB} v^4_B$ for four precoding vectors $v^1_B$, $v^2_B$, $v^3_B$, and $v^4_B$ used by the serving $BS_B$ 302. That is, the effective channel $H_{BB} v^2_B$ 401 for the prohibited precoding vector $v^2 B$ has a greatest gain, followed by the effective channel $H_{BB} v^3_B$ 403 having a second greatest gain, and the effective channel $H_{BB} v^3_B$ 403 is significantly influenced by the interference signal $H_{BA} v^1_A$ 405. Therefore, the precoding vector $v^4_B$ of the effective channel $H_{BB} v^4_B$ 407 for minimizing the influence of interference is selected.

Equation 3 below shows a method of selecting a precoding vector for maximizing a post-processing SINR after canceling influence of the interference signal $H_{BA} v^1_A$ under the assumption that a Minimum Mean-Squared Error (MMSE) receiver is used.

$$v^i_B = v^b_B{}^{max} P(H_{BB} v^i_B)^H \{P(H_{BA} v^a_A)(H_{BA} v^a_A)^H + N_0 I\}^{-1} (H_{BB} v^i_B) \quad \text{[Eqn. 3]}$$

In Equation 3, P denotes transmit power, $N_0$ denotes noise variation, and I denotes a unitary matrix. Additionally, $H_{ij}$ denotes a downlink channel between an $MS_i$ and a $BS_j$, and $v_i$ denotes a precoding vector of a $BS_i$. Furthermore, $v^b_B$ denotes a precoding vector of which use is prohibited to the serving $BS_B$, and $v^a_A$ denotes a precoding vector used by the neighbor $BS_A$.

Thereafter, the $MS_B$ 302 delivers information on the selected precoding vector $v^4_B$ to the serving $BS_B$ 312 through a feedback channel. The serving $BS_B$ 312 transmits downlink data to the $MS_B$ 302 by using the selected precoding vector $v^4_B$.

Figure 5:
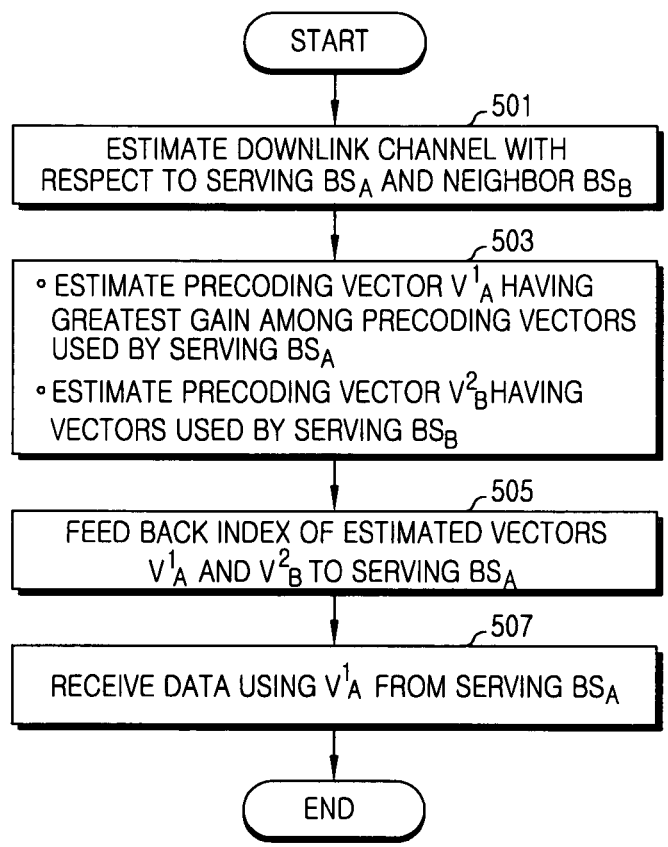
FIG. 5 illustrates a flowchart for an operation of a specific Mobile Station (MS) in a multiple antenna wireless communication system according to an exemplary embodiment of the present invention.

FIG. 5 illustrates a flowchart for an operation of a MS in a multi-antenna wireless communication system according to an exemplary embodiment of the present invention. In the following example discussed with respect to FIG. 5, the MS is the $MS_A$ 310 of FIG. 3.

Referring to FIG. 5, the MS estimates downlink channels with respect to a serving $BS_A$ and a neighbor $BS_B$ in step 501. In this example, each of the serving $BS_A$ and the neighbor $BS_B$ uses an orthogonal pilot, a pseudo-random scramble pilot, and the like, so that the MS can estimate a downlink channel by identifying each BS.

In step 503, the MS estimates a precoding vector $v^1_A$ having a greatest gain among precoding vectors $v^i_A$ used by the serving $BS_A$ by using the downlink channel with respect to the serving $BS_A$, and estimates a precoding vector $v^2_B$ which is expected to have a greatest influence on the MS among precoding vectors $v^i_B$ used by the neighbor $BS_B$ by using the downlink channel with respect to the neighbor $BS_B$. In step 505, the MS feeds back information (e.g., index) on the estimated precoding vectors $v^1_A$ and $v^2_B$ to the serving $BS_A$. In this case, the MS transmits information on the estimated precoding vectors simultaneously to the serving $BS_A$ and the neighbor $BS_B$. In addition, in order to reduce an amount of information transmitted, the MS may transmit only an index of a corresponding precoding vector as information on the estimated precoding vector.

In step 507, the MS receives data transmitted using a precoding vector having the greatest gain from the serving $BS_A$, and then the procedure of FIG. 5 ends.

Figure 6:
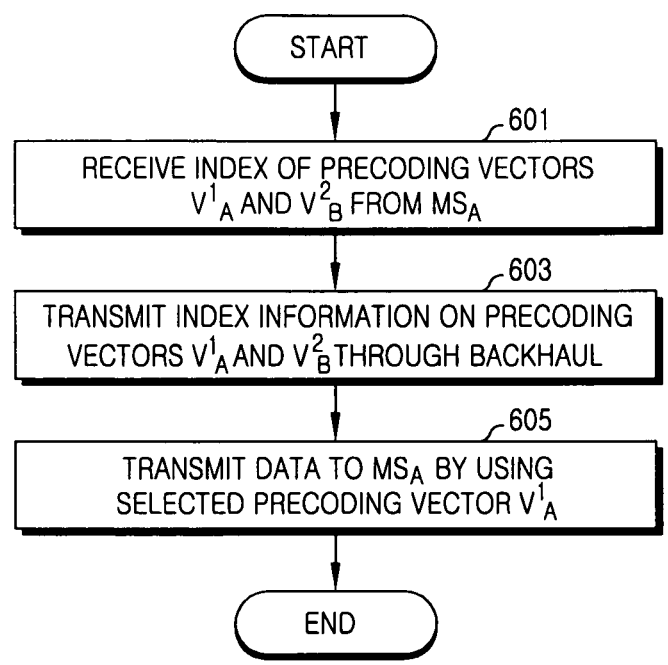
FIG. 6 illustrates a flowchart for an operation of a serving Base Station (BS) of a specific MS in a multiple antenna wireless communication system according to an exemplary embodiment of the present invention.

FIG. 6 illustrates a flowchart for an operation of a serving BS of a specific MS in a multi-antenna wireless communication system according to an exemplary embodiment of the present invention. In the following example discussed with respect to FIG. 6, the serving BS is the $BS_A$ 300 of FIG. 3.

Referring to FIG. 6, the serving BS receives information (e.g., index) of precoding vectors $v^1_A$ and $v^2_B$ from an $MS_A$ which receives a service from the serving BS in step 601, and transmits the received information on the precoding vectors to a neighbor $BS_B$ through a backhaul in step 603. The backhaul denotes an X2 interface in case of using an LTE system for example. The X2 interface may be configured in a wireless or wired fashion.

In step 605, the serving BS evaluates the precoding vector $v^1_A$ to be used by the serving BS from the received information on the precoding vectors $v^1_A$ and $v^2_B$, and transmits data to the $MS_A$ by using the evaluated precoding vector. In this example, the serving BS can evaluate the precoding vector to be used by the serving BS by examining an index of a precoding vector to be used by the serving BS from the received information on the precoding vectors and by examining a precoding vector corresponding to the index from a pre-stored codebook.

Thereafter, the procedure of FIG. 6 ends.

Figure 7:
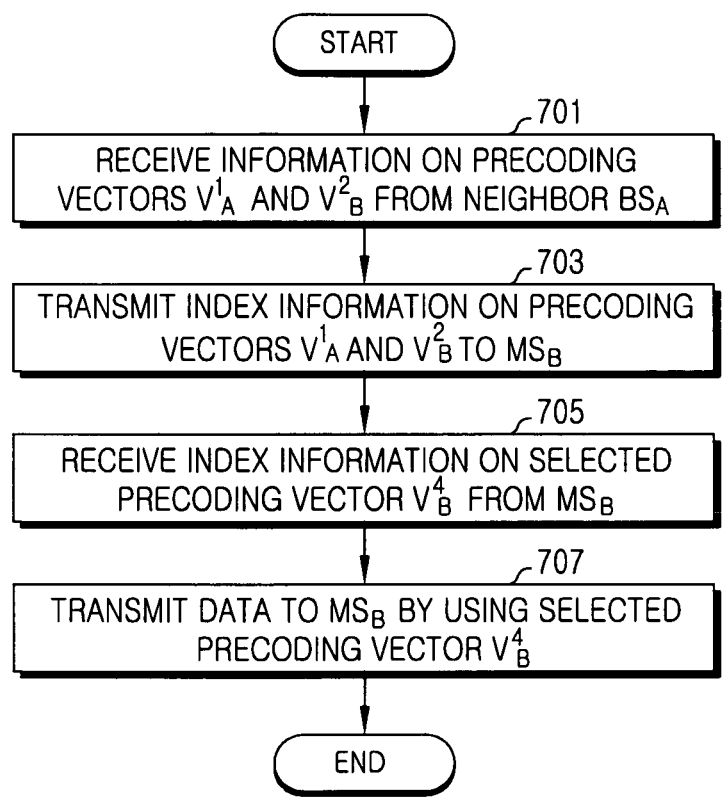
FIG. 7 illustrates a flowchart for an operation of a neighbor BS in a multiple antenna wireless communication system according to an exemplary embodiment of the present invention.

FIG. 7 illustrates a flowchart for an operation of a neighbor BS in a multi-antenna wireless communication system according to an exemplary embodiment of the present invention. In the following example discussed with respect to FIG. 7, the neighbor BS is the $BS_B$ 302 of FIG. 3.

Referring to FIG. 7, the neighbor BS receives information (e.g., index) of precoding vectors $v^1_A$ and $v^2_B$ from its neighbor $BS_A$, i.e., a serving $BS_A$ of a specific MS, in step 701. In this example, the neighbor BS may directly receive the information on precoding vectors from an $MS_A$ included in the coverage of its neighbor $BS_A$.

In step 703, the neighbor BS transmits the received information on precoding vectors to an $MS_B$ included in the coverage of the neighbor BS itself. In this case, the neighbor BS may transmit the information on precoding vectors to the specific MS by appending the information to general control information or may broadcast the information to all MSs.

In step 705, the neighbor BS receives information on a precoding vector $v^4_A$ selected by the $MS_B$ included in the coverage of the neighbor BS. In step 707, the neighbor BS transmits data to the $MS_B$ included in the coverage of the neighbor BS by using the selected precoding vector $v^4_A$.

Thereafter, the procedure of FIG. 7 ends.

Figure 8:
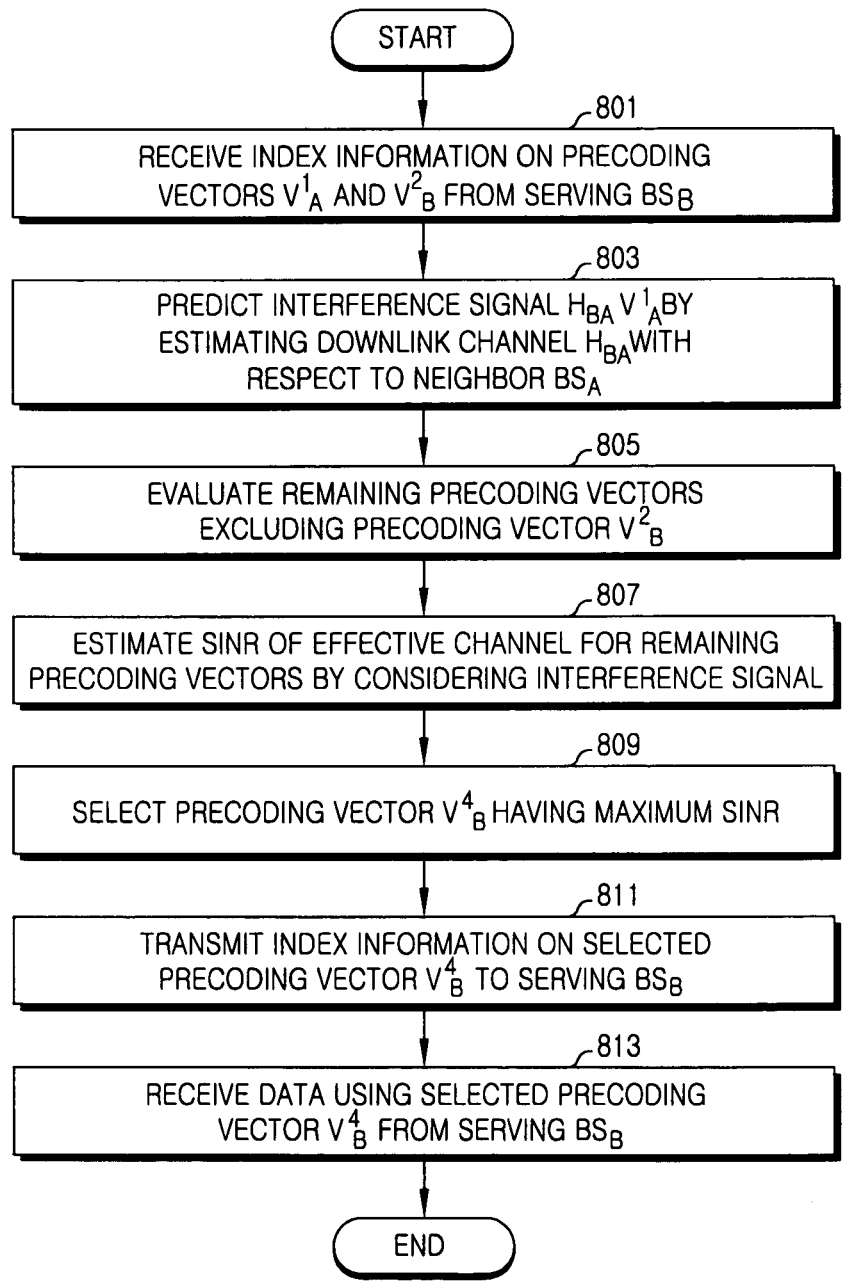
FIG. 8 illustrates a flowchart for an operation of an MS included in the coverage of a neighbor BS in a multiple antenna wireless communication system according to an exemplary embodiment of the present invention.

FIG. 8 illustrates a flowchart for an operation of an MS included in the coverage of a neighbor BS in a multi-antenna wireless communication system according to an exemplary embodiment of the present invention. In the following example discussed with respect to FIG. 8, the MS is the $MS_B$ 312 of FIG. 3.

Referring to FIG. 8, the MS receives information on precoding vectors from its serving $BS_B$ in step 810, and estimates downlink channels with respect to a neighbor $BS_A$ and its serving $BS_B$, and predicts an interference signal from the neighbor $BS_A$ in step 803.

In step 805, the MS evaluates a precoding vector, of which use is prohibited, and a precoding vector used by the neighbor $BS_A$ from information on the precoding vectors, and thereafter evaluates the remaining precoding vectors except for prohibited precoding vectors among precoding vectors used by its serving $BS_B$.

In step 807, the MS estimates a post-processing SINR of an effective channel for the remaining precoding vectors as expressed by Equation 3 above by considering the predicted interference signal. In step 809, the MS selects a precoding vector $v^4_A$ having a maximum value of the estimated SINR. For example, as shown in FIG. 4, the precoding vector $v^4_B$ of the effective channel $H_{BB}v^4_B$ 407 robust to the interference signal $H_{BA}v^1_A$ 405 of the neighbor $BS_A$ 300 is selected from the remaining effective channels $H_{BB}v^1_B$, $H_{BB}v^3_B$, and $H_{BB}v^4_B$ except for an effective channel $H_{BB}v^2_B$ 401 for the prohibited precoding vector $v^2_B$ among effective channels $H_{BB}v^1_B$, $H_{BB}v^2_B$, $H_{BB}v^3_B$, and $H_{BB}v^4_B$ for four precoding vectors $v^1_B$, $v^2_B$, $v^3_B$, and $v^4B$ used by the serving $BS_B$ 302. That is, the effective channel $H_{BB}v^2_B$ 401 for the prohibited precoding vector $v^2_B$ has a greatest gain, followed by the effective channel $H_{BB}v^3_B$ 403 having a second greatest gain, and the effective channel $H_{BB}v^3_B$ 403 is significantly influenced by the interference signal $H_{BA}v^1_A$ 405. Therefore, a precoding vector $v^4_B$ of the effective channel $H_{BB}v^4_B$ 407 for minimizing the influence of interference is selected.

In step 811, the MS transmits information on the selected precoding $v^4_A$ to its serving $BS_B$ through a feedback channel. In step 813, the MS receives data transmitted using the selected precoding vector $v^4_A$ from its serving $BS_B$. Thereafter, the procedure of FIG. 8 ends.

Figure 9:
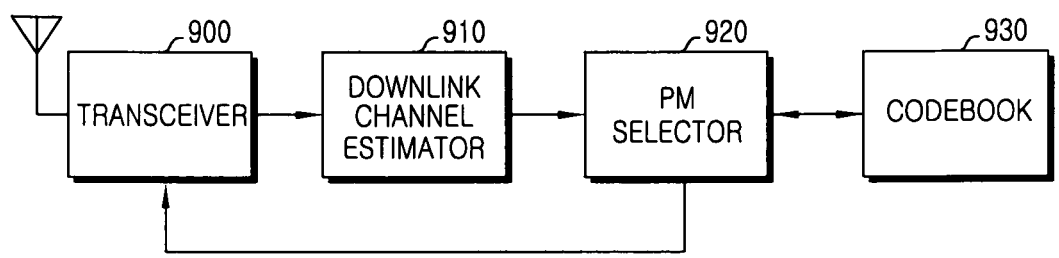
FIG. 9 illustrates a block diagram of a structure of an MS in a multiple antenna wireless communication system according to an exemplary embodiment of the present invention.

FIG. 9 illustrates a block diagram for a structure of an MS in a multi-antenna wireless communication system according to an exemplary embodiment of the present invention.

Referring to FIG. 9, the MS includes a transceiver 900, a downlink channel estimator 910, a Precoding Matrix (PM) selector 920, and a codebook 930.

The transceiver 900 performs a function for transmitting and receiving a radio signal of data which is input or output through an antenna. In particular, the transceiver 900 provides precoding vector information received from a serving BS of the MS to the PM selector 920, and transmits to the serving BS or a neighbor BS the precoding vector information provided from the PM selector 920.

The downlink channel estimator 910 performs a function for estimating a downlink channel with respect to the serving BS or the neighbor BS of the MS. In particular, the downlink channel estimator 910 estimates a downlink channel with respect to a corresponding BS from a pilot signal received from the serving BS or the neighbor BS. In this case, each BS uses an orthogonal pilot or a pseudo-random scramble pilot, so that the MS can identify each BS.

The PM selector 920 uses a downlink channel estimation result provided from the downlink channel estimator 910 to select an optimal precoding vector to be used when the serving BS performs beamforming on downlink data, and transmits the selected precoding vector to the BS via the transceiver 900. According to a situation, the PM selector 920 selects an optimal precoding vector to be used by the serving BS and a precoding vector, of which use is to be prohibited to the neighbor BS, or selects an optimal precoding vector to be used by the serving BS by using the precoding vector information provided from the neighbor BS via the serving BS. That is, if the precoding vector information is not received from the serving BS, the PM selector 920 selects a precoding vector, which has a greatest interference to a precoding vector having a greatest gain for the MS, by using the downlink channel estimation result. Otherwise, if the precoding vector information of the neighbor BS is received from the serving BS, the PM selector 920 evaluates a precoding vector used by the neighbor BS and a precoding vector, of which use is prohibited from the precoding vector information, and thereafter selects a precoding vector robust to the interference signal as expressed by Equation 3 above by predicting an interference signal of the neighbor BS.

The codebook 930 stores a set of precoding vectors used by the BSs. Each BS and the MS equally share the codebook 930.

Figure 10:
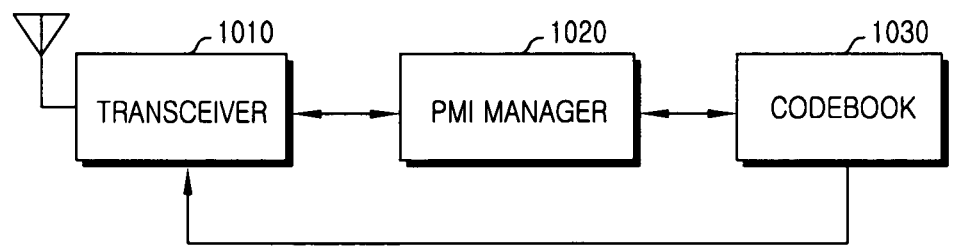
FIG. 10 illustrates a block diagram of a structure of a BS in a multiple antenna wireless communication system according to an exemplary embodiment of the present invention.

FIG. 10 illustrates a block diagram of a structure of a BS in a multi-antenna wireless communication system according to an exemplary embodiment of the present invention.

Referring to FIG. 10, the BS includes a transceiver 1010, a PMI manager 1020, and a codebook 1030.

The transceiver 1010 performs a function for transmitting and receiving a radio signal of data which is input or output through an antenna. In particular, the transceiver 1010 provides precoding vector information received from an MS to the PMI manager 1020, and transmits the precoding vector information provided from the PMI manager 1020 to a neighbor BS through a backhaul. The transceiver 1010 of the BS uses an orthogonal pilot or a pseudo-random scramble pilot, so that the MS can identify each BS.

From the precoding vector information received from the MS via the transceiver 1010, the PMI manager 1020 evaluates a precoding vector to be used by the PMI manager 1020 when downlink data is transmitted to a corresponding MS. Further, if prohibited precoding vector information exists in the received precoding vector information, the PMI manager 1020 provides the received precoding vector information to the transceiver 1010 so that the information is transmitted to the neighbor BS.

The codebook 1030 stores a set of precoding vectors used by the BSs. Each BS and the MS equally share the codebook 1030.

Now, a case where three or more neighbor BSs are present will be described on the basis of the aforementioned configuration in which two neighbor BSs are present.

Figure 11:
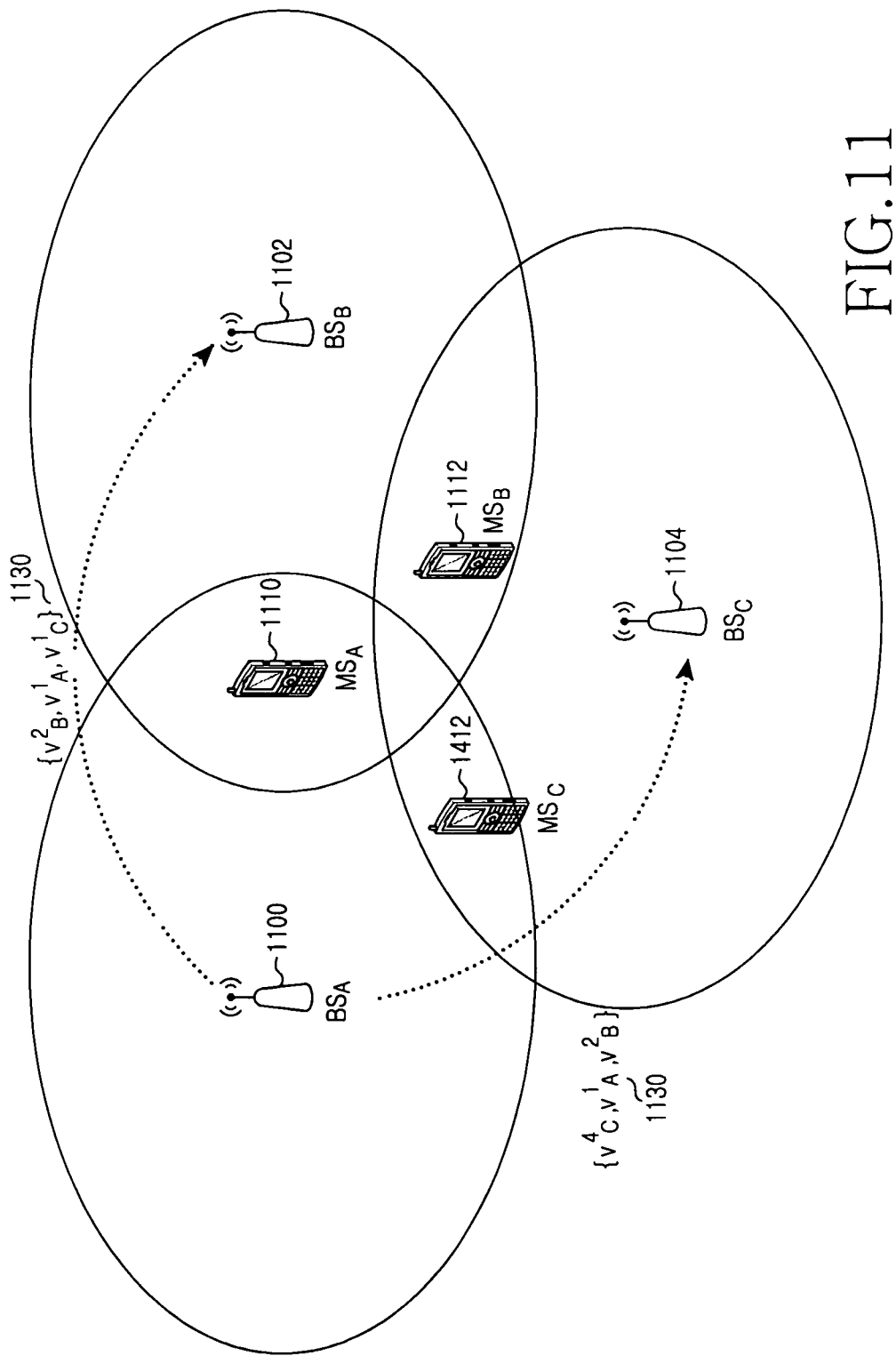
FIG. 11 illustrates a structure of a multiple antenna wireless communication system according to another exemplary embodiment of the present invention.

FIG. 11 illustrates a structure of a multi-antenna wireless communication system according to another exemplary embodiment of the present invention.

Figure 12A:
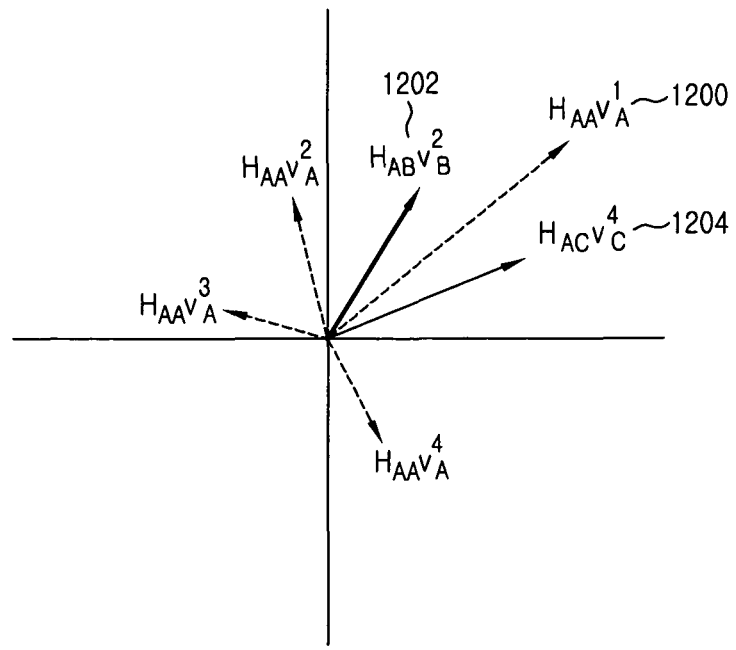
FIGS. 12A and 12B illustrate an example of selecting a precoding matrix in a multiple antenna wireless communication system according to another exemplary embodiment of the present invention.

Referring to FIG. 11, an $MS_A$ 1110 estimates a downlink channel with respect to a serving $BS_A$ 1100 and selects a precoding vector $v^1_A$ having a greatest gain for the $MS_A$ 1110 from precoding vectors $v^i_A$ used by the serving $BS_A$ 1100, and selects precoding vectors $v^2_B$ and $v^4_C$ which are expected to have a greatest interference to the $MS_A$ 1110 from precoding vectors $v^i_B$ and $v^i_C$ used by a neighbor $BS_B$ 1102 and a neighbor $BS_C$ 1104. Thereafter, the $MS_A$ 1110 transmits information on the selected precoding vectors to the serving $BS_A$ 1100. For example, as shown in FIG. 12A, the $MS_A$ 1110 selects a precoding matrix $v^1_A$ of an effective channel $H_{AA}v^1_A$ 1200 having a greatest channel gain as an allowed precoding matrix from effective channels $H_{AA}v^i_A$, and selects a precoding matrix $v^2_B$ of an effective channel $H_{AB}v^2_B$ 1202 and a precoding matrix $v^4_C$ of an effective channel $H_{AC}v^4_C$ 1204, each of which has a greatest gain, as a prohibited precoding matrix from interference effective channels $H_{AB}v^i_B$ and $H_{AC}v^i_C$ of the expected neighbor $BS_B$ 1102 and the expected neighbor $BS_C$ 1104.

Upon receiving information on the allowed precoding vector $v^1_A$ and information on the prohibited precoding vectors $v^2_B$, and $v^4_C$ from the $MS_A$ 1110, as indicated by 1130 in FIG. 11, the $BS_A$ 1100 transmits the received information on the precoding vectors $v^1_A$, $v^2_B$, and $v^4_C$ to the neighbor $BS_B$ 1102 and the neighbor $BS_C$ 1104 through a backhaul. The neighbor $BS_B$ 1102 and the neighbor $BS_C$ 1104 transmit the received information on the precoding vectors $v^1_A$, $v^2_B$, and $v^4_C$ to an $MS_B$ 1112 and an $MS_C$ 1114 respectively included in the coverage of the neighbor $BS_B$ 1102 and the coverage of the neighbor $BS_C$ 1104.

Then, the $MS_B$ 1112 estimates a downlink channel with respect to its neighbor $BS_A$ 1100 and $BS_C$ 1104 and a downlink channel with respect to its serving $BS_B$ 1102, and selects an optimal precoding vector to be used when data is received from the $BS_B$ 1102 by using the information regarding the precoding vectors $v^1_A$, $v^2_B$, and $v^4_C$ and received from the serving $BS_B$ 1102. That is, from the received information on the precoding vectors $v^1_A$, $v^2_B$, and $v^4_C$, the $BS_B$ 1102 evaluates a precoding vector $v^2_B$ prohibited to the $BS_B$ 1102, a precoding vector $v^1_B$ used by the neighbor $BS_A$ 1100, and a precoding vector $v^4_C$ prohibited to the neighbor $BS_C$ 1104. Further, by predicting an interference signal from the neighbor $BS_A$ 1100 and an interference signal not to be received from the neighbor $BS_C$ 1104, the $MS_B$ 1112 selects a precoding vector robust to the predicted interference signal from the remaining precoding vectors except for the prohibited precoding vector $v^2_B$ among the precoding vectors $v^i_B$ used by the serving $BS_B$ 1102, i.e., selects a precoding vector having a maximum post-processing SINR as expressed by Equation 4 below.

Equation 4 shows a method of maximizing a post-processing SINR after canceling influence of the interference signal.

$$v^i_B = v^b_B v^j_C = v^c_C \max_H F[P(H_{BB}v^i_B)]^H \{P(H_{BA}v^a_A)(H_{BA}v^a_A)$$
$$|P(H_{BC}v^i_C)(H_{BC}v^i_C)^H|N_O I\}^{-1}(H_{BB}v^i_B)] \qquad \text{[Eqn. 4]}$$

In Equation 4, P denotes transmit power, $N_0$ denotes noise variation, and I denotes a unitary matrix. Additionally, $H_{ij}$ denotes a downlink channel between an $MS_i$ and a $BS_j$, and $v_i$ denotes a precoding vector of a $BS_i$. Furthermore, $v^b_B$ denotes a precoding vector of which use is prohibited to the serving $BS_B$, $v^a_A$ denotes a precoding vector used by the neighbor $BS_A$, and $v^c_C$ denotes a precoding vector of which use is prohibited to the neighbor $BS_C$.

Referring to Equation 4 above, the $MS_B$ 1112 considers not only the interference signal $H_{BA}v^a_A$ of the neighbor $BS_A$ 1100 but also the interference signal $H_{BC}v^j_C$ possibly received from the neighbor $BS_C$ 1104 to determine a post-processing SINR of each precoding vector, and selects a precoding vector having a maximum value.

Figure 12B:
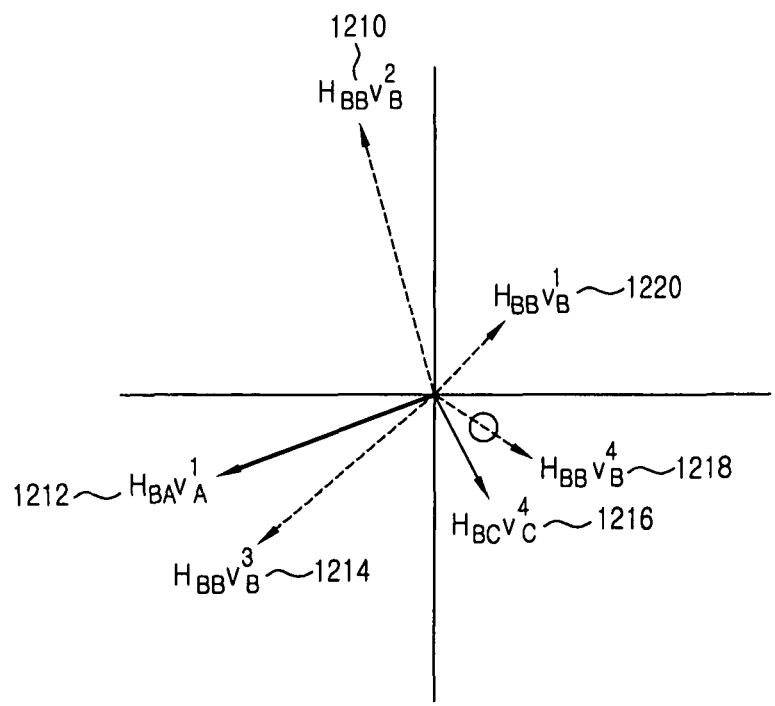

For example, as shown in FIG. 12B, a precoding vector $v^4_B$ of an effective channel $H_{BB}v^4_B$ 1218 robust to an interference signal $H_{BA}v^1_A$ 1212 of the neighbor $BS_A$ 1100 is selected from the remaining effective channels $H_{BB}v^1_B$ 1214, $H_{BB}v^3_B$ 1218, and $H_{BB}v^4_B$ 1220 except for an effective channel $H_{BB}v^2_B$ 1210 for the prohibited precoding vector $v^2_B$ among effective channels $H_{BB}v^1_B$, $H_{BB}v^2_B$, $H_{BB}v^3_B$, and $H_{BB}v^4_B$ for four precoding vectors $v^1_B$, $v^2_B$, $v^3_B$, and $v^4_B$ used by the serving $BS_B$ 1102. In this case, the $MS_B$ 1112 can predict that an interference signal $H_{BC}v^4_C$ 1216 caused by the prohibited precoding vector $v^4_C$ is not received from the neighbor $BS_C$ 1104.

Thereafter, the $BS_B$ 1102 delivers information on the selected precoding vector $v^4_B$ to the serving $BS_B$ 1102 through a feedback channel, and the serving $BS_B$ 1102 transmits downlink data to the $MS_B$ 1112 by using the selected precoding vector $v^4_B$.

In this case, the $MS_C$ 1114 also selects an optimal precoding vector in the same manner as used in the $MS_B$ 1112, and transmits the selected precoding vector to its serving $BS_C$ 1104.

According to exemplary embodiments of the present invention, in a multiple antenna wireless communication system, a serving BS of a specific MS transmits information on a precoding matrix to be used by the serving BS together with information on a prohibited precoding matrix to a neighbor BS, and an MS included in the coverage of the neighbor BS selects a precoding matrix of the MS. Therefore, without significant changes in the conventional system, inter-cell interference can be reduced by exchanging a small amount of information between BSs, thereby increasing system capacity.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a Mobile Station (MS) capable of selecting a precoding matrix in a multi-antenna wireless communication system, the method comprising:
   receiving, from a serving Base Station (BS), information on a precoding matrix of which use is prohibited and a precoding matrix to be used by a neighbor BS;
   estimating, from a pilot signal, an interference signal for the precoding matrix to be used by the neighbor BS; and
   selecting the precoding matrix to be used by the serving BS by considering the estimated interference signal from the remaining precoding matrices except for the precoding matrix of which use is prohibited among precoding matrices used by the serving BS and by selecting a precoding matrix having a maximum post-processing Signal to Interference plus Noise Ratio (SINR) after canceling influence of the estimated interference signal from the remaining precoding matrices.

2. The method of claim 1, wherein the precoding matrix having the maximum SINR after canceling the estimated interference signal is selected using the following equations:

$$v^i_B = v^{b}_B {}^{max} P(H_{BB} v^i_B)^H \{P(H_{BA} v^a_A)(H_{BA} v^a_A)^H + N_O I\}^{-1} (H_{BB} v^i_B);$$

and $$v^i_B = v^{b}_B v^i_C = v^{c}_C {}^{max\, F} [P(H_{BB} v^i_B)^H \{P(H_{BA} v^a_A)(H_{BA} v^a_A) \dot{H} | P(H_{BC} v^i_C)(H_{BC} v^i_C)^H | N_O I\}^{-1} (H_{BB} v^i_B)],$$

where P denotes transmit power, $N_0$ denotes noise variation, I denotes a unitary matrix, $H_{ij}$ denotes a downlink channel between an $MS_i$ and a $BS_j$, $v_i$ denotes a precoding vector of a $BS_i$, $v^b_B$ denotes a precoding vector of which use is prohibited to a serving $BS_B$, $v^a_A$ denotes a precoding vector used by a neighbor $BS_A$, and $v^c_C$ denotes a precoding vector of which use is prohibited to a neighbor $BS_C$.

3. A method of operating a Base Station (BS) in a multi-antenna wireless communication system, the BS operable to provide precoding matrix information in the multi-antenna wireless communication system, the method comprising:
   receiving, from a Mobile Station (MS), information on a precoding matrix to be used by the BS and a restricted precoding matrix, wherein use of the restricted matrix is prohibited to a neighbor BS, wherein the precoding matrix to be used by the BS is a precoding matrix having a maximum post-processing Signal to Interference plus Noise Ratio (SINR) after canceling influence of the estimated interference signal from the remaining precoding matrices; and
   transmitting, to the neighbor BS, the information on the precoding matrix to be used by the BS and the restricted precoding matrix.

4. The method of claim 3, further comprising transmitting data to the MS using the precoding matrix.

5. A method for operating a Base Station (BS) capable of selecting a precoding matrix in a multi-antenna wireless communication system, the method comprising:
   receiving, from a neighbor BS, information on a restricted precoding matrix and a precoding matrix used by the neighbor BS, wherein use of the restricted precoding matrix is prohibited, wherein the precoding matrix to be used by the neighbor BS is a precoding matrix having a maximum post-processing Signal to Interference plus Noise Ratio (SINR) after canceling influence of the estimated interference signal from the remaining precoding matrices; and
   transmitting, to a Mobile Station (MS) included in the coverage of the BS, information on the restricted precoding matrix and the precoding matrix to be used by the neighbor BS.

6. The method of claim 5, further comprising receiving index information on selected precoding matrix.

7. The method of claim 6, further comprising transmitting data to the MS using the selected precoding matrix.

8. A Mobile Station (MS) capable of communicating in a multi-antenna wireless communication system, the mobile station comprising:
   a transceiver configured to transmit and receive data; and
   a precoding matrix selector configured to select a precoding matrix in based on an estimated interference signal from a plurality of precoding matrices except for at least one restricted precoding matrix among precoding matrices used by a serving Base Station (BS), wherein use of the at least one restricted precoding matrix is prohibited and wherein the precoding matrix selector is configured to select a precoding matrix having a maximum post-processing Signal to Interference plus Noise Ratio (SINR) after canceling influence of the estimated interference signal from the remaining precoding matrices.

9. The mobile station of claim 8, wherein the transceiver is configured to receive, from the serving BS, information on the at least one restricted precoding matrix and a second precoding matrix to be used by a neighbor BS.

10. The mobile station of claim 9, wherein the precoding matrix selector is configured to estimate an interference signal for the second precoding matrix to be used by the neighbor BS, and for selecting the precoding matrix to be used by the serving BS.

11. The mobile station of claim 8, wherein the precoding matrix selector selects the precoding matrix having the maximum SINR after canceling the estimated interference signal by using the following equations:

$$v^i_B = v^{b}_B {}^{max} P(H_{BB} v^i_B)^H \{P(H_{BA} v^a_A)(H_{BA} v^a_A)^H + N_O I\}^{-1} (H_{BB} v^i_B);$$

and $$v^i_B = v^{b}_B v^i_C = v^{c}_C {}^{max\, F} [P(H_{BB} v^i_B)^H \{P(H_{BA} v^a_A)(H_{BA} v^a_A) \dot{H} | P(H_{BC} v^i_C)(H_{BC} v^i_C)^H | N_O I\}^{-1} (H_{BB} v^i_B)],$$

where P denotes transmit power, $N_0$ denotes noise variation, I denotes a unitary matrix, $H_{ij}$ denotes a downlink channel between an $MS_i$ and a $BS_j$, $v_i$ denotes a precoding vector of a $BS_i$, $v^b_B$ denotes a precoding vector of which use is prohibited to a serving $BS_B$, $v^a_A$ denotes a precoding vector used by a neighbor $BS_A$, and $v^c{}_C$ denotes a precoding vector of which use is prohibited to a neighbor $BS_C$.

12. A Base Station (BS) capable of providing precoding matrix information in a multi-antenna wireless communication system, the apparatus comprising a transceiver configured to receive, from a Mobile Station (MS), information on a precoding matrix to be used by the BS and a restricted precoding matrix, wherein use of the restricted precoding matrix is prohibited to a neighbor BS, and wherein the precoding matrix to be used by the BS is a precoding matrix having a maximum post-processing Signal to Interference plus Noise Ratio (SINR) after canceling influence of the estimated interference signal from the remaining precoding matrices the transceiver further configured to transmit, to the neighbor BS, the information on the precoding matrix to be used by the BS and the restricted precoding matrix.

13. The BS of claim 12, further comprising a Precoding Matrix Index (PMI) manager configured to evaluate the precoding matrix and provide the received information on the precoding matrix to the transceiver if prohibited precoding matrix information exists.

14. The BS of claim 12, further comprising a codebook configured to store a set of precoding vectors to be used by the BS.

15. A Base Station (BS) capable of selecting a precoding matrix in a multi-antenna wireless communication system, the apparatus comprising a transceiver configured to receive, from a neighbor BS, information on a restricted precoding matrix and a precoding matrix used by the neighbor BS, and configured to transmit, to a Mobile Station (MS) included in the coverage of the BS, information on the restricted precoding matrix and the precoding matrix to be used by the neighbor BS, wherein use of the restricted precoding matrix is prohibited, and wherein the precoding matrix to be used by the neighbor BS is a precoding matrix having a maximum post-processing Signal to Interference plus Noise Ratio (SINR) after canceling influence of the estimated interference signal from the remaining precoding matrices.

16. The BS of claim 15, further comprising a Precoding Matrix Index (PMI) manager configured to evaluate the precoding matrix and provide the received information on the precoding matrix to the transceiver if prohibited precoding matrix information exists.

17. The BS of claim 15, wherein the transceiver is configured to receive, from the MS, index information on selected precoding matrix.

18. The BS of claim 17, wherein the transceiver is configured to transmit data to the MS using the selected precoding matrix.

* * * * *